(12) United States Patent
Nervi et al.

(10) Patent No.: US 10,185,791 B2
(45) Date of Patent: Jan. 22, 2019

(54) INITIAL STRESS AND EIGENSTRAIN COMPUTATION SYSTEM AND METHOD

(71) Applicant: THE BOEING COMPANY, Huntington Beach, CA (US)

(72) Inventors: Sebastian Nervi, St. Louis, MO (US); Jared L. Bolin, Berkeley, MO (US); James B. Castle, Rolla, MO (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 14/988,541

(22) Filed: Jan. 5, 2016

(65) Prior Publication Data
US 2017/0193156 A1    Jul. 6, 2017

(51) Int. Cl.
G06F 17/50    (2006.01)

(52) U.S. Cl.
CPC ...... *G06F 17/5009* (2013.01); *G06F 2217/42* (2013.01); *G06F 2217/44* (2013.01)

(58) Field of Classification Search
None
See application file for complete search history.

(56) References Cited

U.S. PATENT DOCUMENTS

2014/0330525 A1*  11/2014  Nervi .................. G06F 17/5009
                                                  702/34

OTHER PUBLICATIONS

Jun et al., "Evaluation of residual stresses and strains using the Eigenstrain Reconstruction Method", International Journal of Solids and Structures, vol. 47, pp. 1678-1686, 2010.
Toshio Mura, "Micromechanics of defects in solids", Second Edition, Klumer Academic Publishers, pp. 1-3, 6-7, 52-53, 58-59, 68-69, 74-75, 88-89, 102-103, 114-115, 120-121, 131-135, 144-145, 156-159, 172-173 and 486-489, 1987.
M. Watkins, "User's Guide Prediction of Distortion Due to the Presence of Subsurface Residual Stresses", Engineering Software Research & Development, Inc., pp. 1-12, 2011.
Yury I. Zamashchikov, "Machining residual stresses and part distortions", International Journal Machining and Machinability of Material, vol. 2, No. 3, 2007.

* cited by examiner

*Primary Examiner* — Syed A Roni
(74) *Attorney, Agent, or Firm* — Womble Bond Dickinson (US) LLP

(57) ABSTRACT

A system and method are provided for estimating initial stresses in and eigenstrains of a material. The system may receive measured geometric data including measurements of a material before and after the application of a manufacturing process thereto. The measurements may indicate a residual stress in a coupon after application of the manufacturing process. Estimated linear elastic strains may be calculated in respective opposing sides of the coupon based on the measured geometric data. A linear elastic reaction of the material to the manufacturing process may be calculated based at least in part on the estimated linear elastic strains. The system may then calculate an estimated initial stress in the material as a sum of the residual stress in the coupon and the linear elastic reaction of the material, and calculate an estimated eigenstrain of the material based at least in part on the estimated initial stress in the material.

24 Claims, 13 Drawing Sheets

INITIAL STRESS AND EIGENSTRAIN COMPUTATION SYSTEM AND METHOD

TECHNOLOGICAL FIELD

The present disclosure relates generally to initial stress and eigenstrain computations and, in particular, to estimating initial stresses and eigenstrains, in and of materials, caused by the application of surface processes to the materials.

BACKGROUND

Manufacturing processes for metallic and composite structures or materials may induce incompatibilities that result in residual stresses and/or distortion. The manufacturing processes may include forming operations such as extruding, forging, quenching, machining, laminate layup, curing, and the like, and post-forming operations such as shot peening, laser peening, ultrasonic impact forming (UIF), and the like. In a continuous elastic material, these incompatibilities are compensated for with a residual stress and distortion.

Typically, residual stresses may develop from a part of the incompatibilities that may be compensated for with a mechanical elastic strain field inside the material. The uncompensated part of the incompatibilities may produce distortion. In instances in which all of the incompatibilities may be compensated for by a compatible elastic strain field within the material, the residual stresses may develop without any distortion. Likewise, if no part of the incompatibilities may be balanced by a compatible strain field then the material may distort without the development of any residual stresses.

As used herein, the phrase initial stress in a material may be related to deformation, strain, or structural stress within the material of an article or structural element prior to relaxation via deformation of the article. Exemplary operations that may be performed on an article and thereby result in a deformation of the article may include manufacturing processes such as shot peening laser shock peening, or needle peening. Further, the phrase eigenstrain of a material may relate to deformation, strain, or structural stress within the material of an article that was imparted by external processing but remains after the external forces are released. Exemplary eigenstrain can include forces caused by shot peening, laser shock peening, or needle peening.

Within the context of residual stresses, initial stresses are defined as stresses obtained by direct conversion of incompatibilities caused by forming and/or manufacturing processes of a part. Residual stresses exist on a material in the absence of external loads and are a result of the relaxation of initial stresses for the purpose of achieving equilibrium (e.g., in the absence of external loads) within the material. In instances in which no plasticity is generated when the initial stresses relax, the relaxation may occur elastically. If a material is linear, the elastic relaxation may be given by the components of the initial stresses that do not satisfy equilibrium, in the absence of external loads, within the domain of the material. Reconstruction of initial stresses may require the estimation of residual stresses and the linear elastic relaxation of a coupon, part or component of a material.

Furthermore, initial stress may refer to forces per unit area related to differential equilibrium equations and an eigenstrain may be the spatial variations (differentials) of a displacement field. The relationship between initial stresses and eigenstrains may be denoted by typical properties of material law. For example, in the case of linear elasticity, the initial stress-eigenstrain relationship may be given by:

$$\sigma_{ij} = C_{ijkl}\varepsilon_{kl} \text{ or inversely by } \varepsilon_{kl} = C_{ijkl}^{-1}\sigma_{ij}$$

where the coefficients of the $C_{ijkl}$ tensor are material properties characterized by the Lame constants. This relationship, well known and established in the fields of continuum mechanics or solid mechanics, is considered within the linear elastic range.

In general, calculation of either initial stresses or eigenstrains caused from a surface process from experimental data may require substantial measurements. Several surface and subsurface measurements are required in order to resolve spatial variations and to provide adequate information to extrapolate the linear elastic response of a material. Various methods may be utilized for the identification of initial stresses, and in some instances, these methods may require data derived from empirical observations in addition to calculated values. For typical methods, obtaining the residual stress measurements required to calculate the initial stress or eigenstrains may require a significant effort as the residual stresses act along the entire domain of the material. In particular, for surface processes, residual stresses are required to be measured past the penetration depth of the process and reflect substantial data points in order for observations of a linear elastic response to be feasible. In many instances, the linear elastic portion of the residual stress (e.g., the part of the material reacting to the plastic layer caused by the surface process) is affected by pre-existing residual stresses; therefore, the residual stresses on the linear elastic response of the material after the surface process may not be clearly distinguished unless additional residual stress measurements prior the surface process are generated in addition.

BRIEF SUMMARY

Example implementations of the present disclosure are directed to an improved system, method and computer-readable storage medium for estimating an initial stress in and an eigenstrain of a material caused by application of a manufacturing process thereto. Eigenstrains or initial stresses obtained from simple coupon data following this methodology can be used for the computation of distortion and residual stresses on complex shapes for forming or rectifying problems, for the estimation of the impact of residual stresses on the fatigue life of a component, and for evaluation of structural integrity such as onset of buckling from surface process. The present disclosure includes, without limitation, the following example implementations.

In some example implementations, a method is provided for estimating an initial stress in and an eigenstrain of a material caused by application of a manufacturing process thereto. The method comprises receiving measured geometric data from a scanner configured to scan a coupon of the material before and after the application of the manufacturing process to the material, the measured geometric data indicating a residual stress in the coupon after application of the manufacturing process. The method also comprises calculating linear elastic strains in respective opposing sides of the coupon caused by application of the manufacturing process, the linear elastic strains being calculated based at least in part on the measured geometric data. The method also comprises calculating a linear elastic reaction of the material to the manufacturing process based at least in part on the linear elastic strains. The method also comprises calculating an estimated initial stress in the material as a sum of the residual stress in the coupon and the linear elastic reaction of the material, and calculating an estimated eigenstrain of the material based at least in part on the estimated initial stress in the material. The method also comprises predicting at least one of a deformation, fatigue life, or buckling for a part associated with the material based at least in part on the estimated initial stress in and eigenstrain of the material.

In some example implementations, an apparatus is provided for estimating an initial stress in and an eigenstrain of a material caused by application of a manufacturing process thereto. The apparatus comprises a processor, and a memory storing executable instructions that, in response to execution by the processor, cause the apparatus to at least receive measured geometric data from a scanner configured to scan a coupon of the material before and after the application of the manufacturing process to the material, the measured geometric data indicating a residual stress in the coupon after application of the manufacturing process; calculate linear elastic strains in respective opposing sides of the coupon caused by application of the manufacturing process, the linear elastic strains being calculated based at least in part on the measured geometric data; calculate a linear elastic reaction of the material to the manufacturing process based at least in part on the linear elastic strains; calculate an estimated initial stress in the material as a sum of the residual stress in the coupon and the linear elastic reaction of the material; calculate an estimated eigenstrain of the material based at least in part on the estimated initial stress in the material; and predict at least one of a deformation, fatigue life, or buckling for a part associated with the material based at least in part on the estimated initial stress in and eigenstrain of the material.

In some example implementations, a computer-readable storage medium for estimating an initial stress in and an eigenstrain of a material caused by application of a manufacturing process thereto. The computer-readable storage medium having computer-readable program code stored therein that, in response to execution by a processor, cause an apparatus to at least receive measured geometric data from a scanner configured to scan a coupon of the material before and after the application of the manufacturing process to the material, the measured geometric data indicating a residual stress in the coupon after application of the manufacturing process; calculate linear elastic strains in respective opposing sides of the coupon caused by application of the manufacturing process, the linear elastic strains being calculated based at least in part on the measured geometric data; calculate a linear elastic reaction of the material to the manufacturing process based at least in part on the linear elastic strains; calculate an estimated initial stress in the material as a sum of the residual stress in the coupon and the linear elastic reaction of the material; calculate an estimated eigenstrain of the material based at least in part on the estimated initial stress in the material; and predict at least one of a deformation, fatigue life, or buckling for a part associated with the material based at least in part on the estimated initial stress in and eigenstrain of the material.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
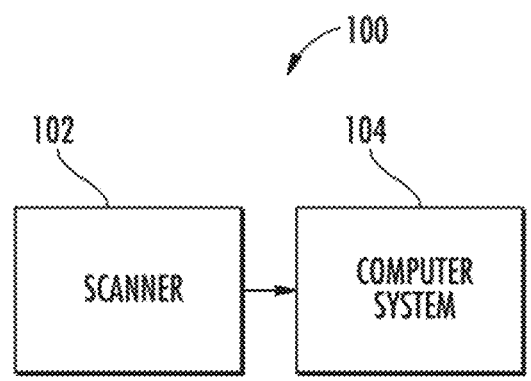
FIG. 1 is an illustration of a system for estimating an initial stress in and an eigenstrain of a material, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to acquiring adequate data points past the penetration depth of a manufacturing process for efficiently calculating initial stresses and eigenstrains incurred due to the application of the manufacturing process to a material, and in particular, generating residual stress data for large depths in order to reconstruct the initial stresses or eigenstrains. The manufacturing process may include forming operations such as extruding, forging, quenching, machining, laminate layup, curing, and the like, and post-forming operations such as shot peening, laser peening, UT, and the like. In particular, the present disclosure may describe a process for obtaining data with minimal cost and measurements incurred.

Eigenstrains (or eigenstrain fields) or initial stresses obtained from simple coupon data using example implementations of the present disclosure may be used for the computation of distortion and residual stresses on complex shapes for forming or rectifying problems, for the estimation of the impact of residual stresses on the fatigue life of a component, and for evaluation of structural integrity such as onset of buckling from surface process. Compressive residual stresses may create a longer fatigue life of a respective part. Initial stresses, as determined herein, may impart a compressive residual stress which may be utilized to extend fatigue life, but may also impart a tensile residual stress lowering fatigue life. At the same time, initial stresses may also impart a deformation which can form a part or distort a part in various manners such as buckling. In instances in which, the initial stress and/or eigenstrains are not properly assessed, the initial stress or eigenstrain may impart a detrimental effects on the respective part. Based on the present disclosure an eigenstrain may be calculated such that it results in a predetermined effect (e.g., a beneficial effect) for the respective part.

For example, the initial stress or eigenstrain that may result in a residual stress field when applied to a part may be determined. The residual stress field may then be analyzed to determine if it is beneficial to a part life and to what extent it may be beneficial. Similarly, initial stresses or eigenstrains from surface processes may be used to shape (form) or reshape (rectify) a component. Knowing the initial stresses from multiple surface processes and their different settings or variations may in return eliminate trial and error, and the specific expertise required to determined useful and efficient use of similar methodology.

FIG. 1 illustrates a system for estimating an initial stress in and an eigenstrain of a material 100 according to example implementations of the present disclosure, which may be simply referred to as the "system" herein. The system 100 may include one or more of each of a number of different subsystems (each an individual system) coupled to one another for performing one or more functions or operations. As shown in FIG. 1, for example, the system may include a scanner 102 and a computer system 104 that may be coupled to one another. Although shown as part of the system, it should be understood that either the scanner or computer system may function or operate as a separate system without regard to the other. And further, it should be understood that the system may include one or more additional or alternative subsystems than those shown in FIG. 1. For example, a calculated initial stress or eigenstrain may be output to a separate user system for further utilization or analysis.

The scanner 102 may be generally configured to scan a coupon of a material before and after the application of the manufacturing process to the material, and thereby generate measured geometric data. The computer system 104 may be generally configured to receive the measured geometric data from the scanner. After receiving the measured geometric data, the computer system may be generally configured to calculate linear elastic strains in respective opposing sides of the coupon caused by application of the manufacturing process in which the linear elastic strains may be calculated based at least in part on the measured geometric data. The computer system may then calculate a linear elastic reaction of the material to the manufacturing process based at least in part on the linear elastic strains. The computer system may further calculate an estimated initial stress in the material as a sum or linear combination of the residual stress in the coupon and the linear elastic reaction of the material and calculate an estimated eigenstrain of the material based at least in part on the estimated initial stress in the material. The computer system may then predict at least one of a deformation, fatigue life, or buckling for a part associated with the material based at least in part on the estimated initial stress in and eigenstrain of the material. In some examples, the computer system may apply an eigenstrain to the part in a suitable manner for optimal fatigue life and shaping.

It should be noted that, in one or more of the example implementations discussed herein, a plurality of assumptions may be implied. For example, it may be implied that a depth d exist below the processed surface after which the effects of the process may be negligible, an eigenstrain induced by a surface process may be uniform on the surface in various instances, and in-plane tensor components may be considered input data while out-of-plane tensor components may be neglected. At least some of these assumptions are discussed in further detail below, and indicated in U.S. Pat. No. 8,645,086, the content of which is hereby incorporated by reference in its entirety.

In terms of linear elasticity, a material affected by incompatibilities of a manufacturing process may be generally described by the following relation:

$$\sigma_{ij} = C_{ijkl}(\varepsilon_{kl}^T - \varepsilon_{ij}^0)$$

where $\sigma_{ij}$ may be the stress field, $C_{ijkl}$ may be the material stiffness matrix, $\varepsilon_{kl}^T$ may be the total strain, and $\varepsilon_{ij}^0$ may be the induced incompatible strain field in which each term may be defined continuously throughout the material.

The mathematical notation $\varepsilon_{ij}^0$ may be interchangeably referred to as "initial strains," "incompatible strains," "engineered strains," "eigenstrains," or "inherent strains". Although it should be noted that hereinafter, the term $\varepsilon_{ij}^0$ may be commonly referred to as an "eigenstrain" which may generally refer to a characteristic strain.

The eigenstrain $\varepsilon_{ij}^0$ may be considered to be the result of various sources of incompatibilities such as induced incompatible strains $\tilde{\varepsilon}_{ij}^0$ from manufacturing processes, thermal strains $\varepsilon_{ij}^{th}$, and initial strains which may be related to initial stresses $\sigma_{kl}^0$ by the inverse of the material stiffness matrix according to the following:

$$\varepsilon_{ij}^0 = \check{\varepsilon}_{ij}^0 + \varepsilon_{ij}^{th} - C_{ijkl}^{-1}\sigma_{kl}^0$$

Accordingly, as used herein for simplicity, the terms "initial stress" and "eigenstrain" may be used interchangeably in one or more instances, with respect to this relation. In particular, the terms may refer to the same value in which the value may be either interpreted as a strain and/or a stress for which an intermediate transformation may be required, the transformation being assumed to be linear in at least one instance.

Figure 2:
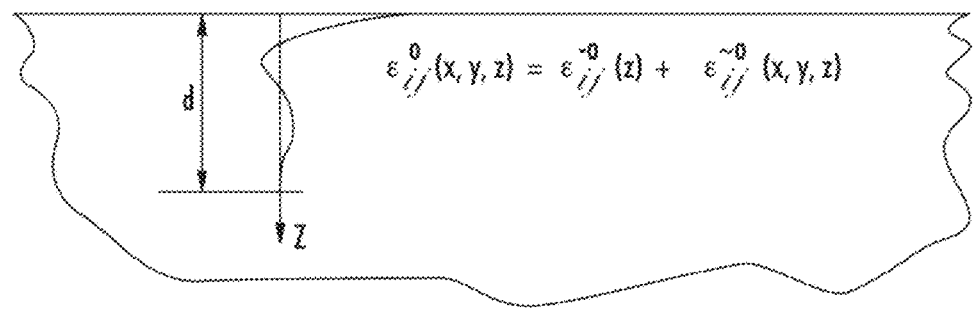
FIGS. 2, 3, 4A and 4B illustrate initial stress distributions, in accordance with an example implementation.

A surface process may produce an eigenstrain distribution $\varepsilon_{ij}^0(x, y, z)$ throughout a material. By definition, the effects of a surface process may decay away from the surface. Accordingly, as used herein, a surface process may be, or include, a process that modifies the surface of a material and which effects decay to zero away from the surface. Herein, a first assumption may be implied that a depth d exist below the processed surface after which the effects of the process may be negligible. As illustrated in FIG. 2, in some example implementations, the z-direction may be aligned with the inverse normal of a processed surface, such that $\varepsilon_{ij}^0(x, y, z) \approx 0$ when $z \geq d$. Based at least in part on this assumption, the eigenstrain distribution may be noted as $\varepsilon_{ij}^0(x, y, z) = \bar{\varepsilon}_{ij}^0(z) + \tilde{\varepsilon}_{ij}^0(x, y, z)$ where $\bar{\varepsilon}_{ij}^0(z)$ may be the induced eigenstrains in an averaged sense and $\tilde{\varepsilon}_{ij}^0(x, y, z)$ may be variations in the induced eigenstrains with respect to $\bar{\varepsilon}_{ij}^0(z)$.

Figure 3:
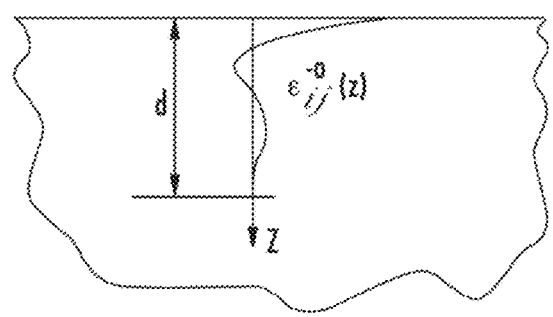

Furthermore, a second assumption may be implied herein that an eigenstrain induced by a surface process may be uniform on the surface in instances in which the process parameters and material may remain constant and/or any variations from point to point may be a result of small deviations in the process parameters and material properties. Based at least in part on the second assumption, as illustrated in FIG. 3, it may be expected that $|\bar{\varepsilon}_{ij}^0(z)| \gg |\tilde{\varepsilon}_{ij}^0(x, y, z)|$. In particular, the $\tilde{\varepsilon}_{ij}^0(x, y, z)$ term may be considered negligible such that the eigenstrain induced by a surface process may be considered to be a function of one spatial variable only, namely the inverse surface normal z. Accordingly, as used hereinafter, the terms "initial stress" and "eigenstrain" may be used interchangeably in one or more instances, with respect to the following relation:

$$\sigma_{ij}^0 = -C_{ijkl}\varepsilon_{ij}^0$$

In particular, this relational equation may characterize a transformation from eigenstrains to initial stresses in the context of linear elasticity.

Based on the stress-free boundary condition which indicates that if no loads are acting on a surface, the surface may be free and thereby unable to generate a reaction, it may be known that the components $\sigma_z^0$, $\tau_{zx}^0$, and $\tau_{zy}^0$ of the initial stress tensor induced by a process must be zero at the processed surface (where z=0). Additionally, it may be expected that all initial stress components decay to zero ($\sigma_{ij}^0 \approx 0$) after the effects of the surface process have decayed (for $z \geq d$). More particularly, the stress components that act with respect to a normal direction (e.g., a direction required to be balanced by an external force) must be zero. Therefore, the components of the surface process must be zero unless an external force is applied. As a result of the effects of the surface process being confined to a small layer of material, there may be little room for the stress components $\sigma_z^0$, $\tau_{xz}^0$, and $\tau_{yz}^0$ to develop significant magnitudes; therefore, a third assumption may be implied that:

$$\min(|\tau_x^0|, |\sigma_y^0|, |\tau_{xy}^0|) \gg \max(|\sigma_z^0|, |\tau_{xz}^0|, |\tau_{yz}^0|)$$

In particular, the three in-plane tensor components may be considered input data while the three out-of-plane tensor components may be neglected.

In some example implementations, given that residual stresses may be balanced within a material, it may follow that a part of the initial stresses that does not satisfy the equilibrium equations may be responsible for distortion. Additionally, based at least in part on the definition of a surface process, the material below a certain depth ($z \geq d$) may be unaffected by a surface process, and assuming that d is small relative to the thickness of the material underneath the processed surface, the reaction of the material to the surface process may be purely elastic. The reaction to the initial stresses induced in the layer of material affected by the surface process may be to balance for equilibrium. Such a reaction may therefore be equivalent for any initial stress distributions which are statically equivalent. As a result, it may follow that distortion may be driven only by the force and moment resultants of the initial stresses, and that knowledge of the actual distribution of the initial stresses may not be required.

Figure 4A:
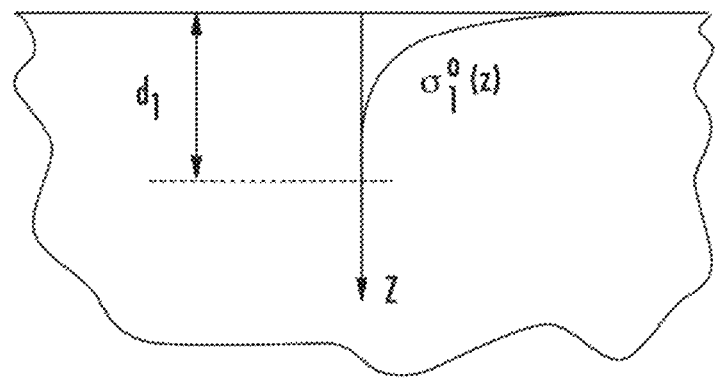
Figure 4B:
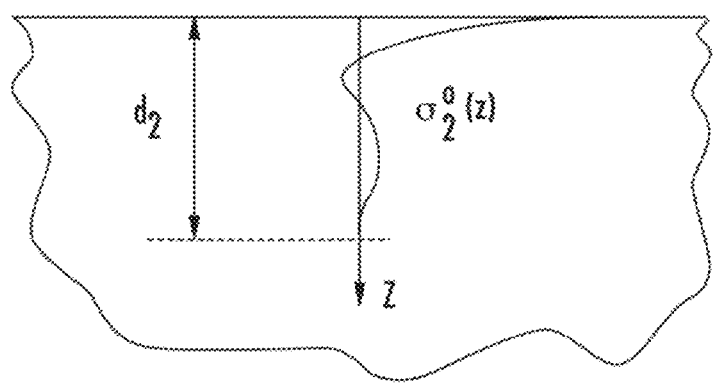

In one implementation, for example, two statically equivalent initial stress distributions are contained within a layer of material, as illustrated in FIGS. 4A and 4B, where $\tau_1^0 \approx 0$ for $z \geq d_1$ and $\sigma_2^0 \approx 0$ for $z \geq d_2$. It should be noted that the two initial stress distributions are not self-equilibrated, and for simplicity, only one component of the stress tensor is illustrated. As a result of $\sigma_1^0$ and $\tau_2^0$ being statically equivalent, the corresponding force and moment resultants may be equal:

$$\int_0^{d_1} \sigma_1^0 dz = \int_0^{d_1} \sigma_2^0 dz = C_1$$

$$\int_0^{d_2} \sigma_1^0 dz = \int_0^{d_2} \sigma_2^0 z dz = C_2$$

where $C_1$ and $C_2$, are the force and moment resultants, respectively, and may be two parameters that characterize a surface process. Accordingly, any two surface processes which induce initial stress distributions with identical $C_1$ and $C_2$ parameters may resultantly produce identical distortion.

As previously mentioned, the scanner 102 may be generally configured to scan a coupon of a material before and after the application of the manufacturing process to the material, and thereby generate measured geometric data. Scanning the coupon before and after the application of the manufacturing process may allow a determination of how much bending and/or deformation was caused by the manufacturing process. Linear elastic strains may be subsequently calculated by this geometric data. In some examples, the scanner may be or include any of a number of different metrology systems. One example of a suitable system is the ARAMIS system distributed by GOM mbH of Braunschweig, Germany. The scanner may also be or include a laser scanner, worklight barcode scanner, or the like. It should be noted that although measured geometric data may be generated as a result of scanning a coupon of a material, one or more other methods not explicitly stated herein may be utilized for generating measured geometric data.

The manufacturing process may cause various effects of the material. In one example implementation, the material may include a flat part prior to the application of the manufacturing process, and afterwards the part may be formed to an aerospace desired shape by a respective initial strain associated with the manufacturing process. In another example implementation, the material may include a fatigue deficient part prior to the application of the manufacturing process, and afterwards the life of the part may be extended due to an impartation of initial strain associated with the manufacturing process, thereby leading to a beneficial residual stress. In yet another example implementation, the material may include a part that is dimensionally unacceptable prior to the application of the manufacturing process, and afterwards the part may be reshaped back to an original tolerance by a respective initial strain associated with the manufacturing process.

Figure 5:
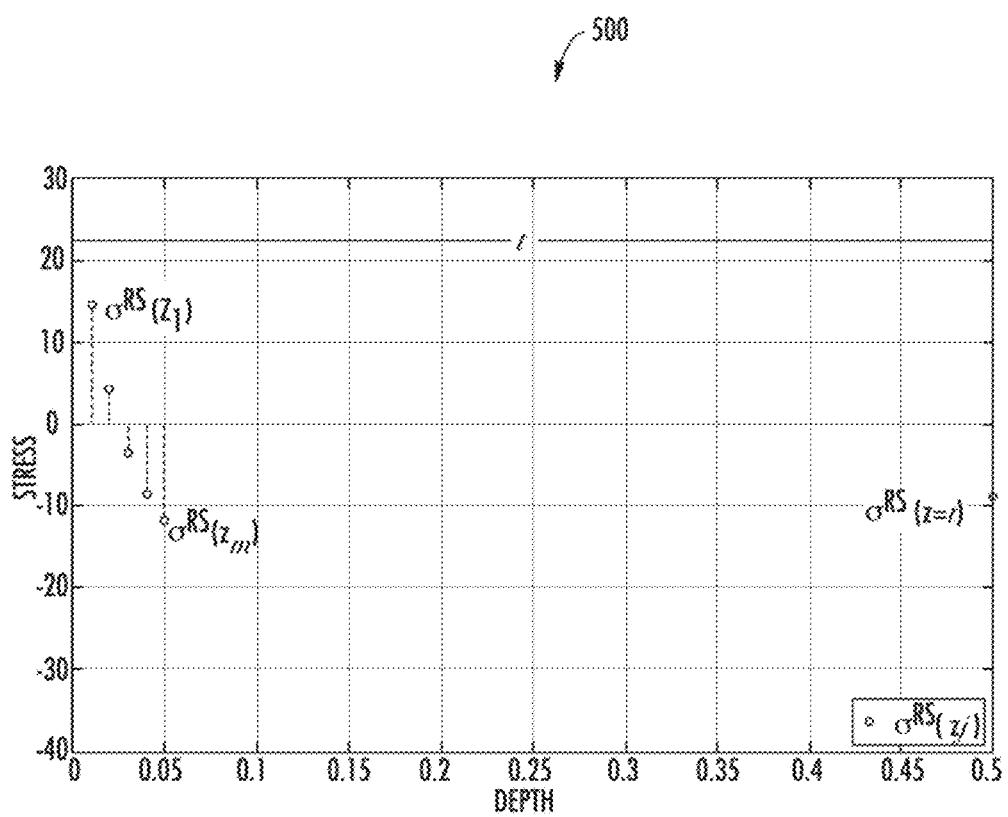
FIG. 5 illustrates residual stress measurements, in accordance with an example implementation.
Figure 6A:
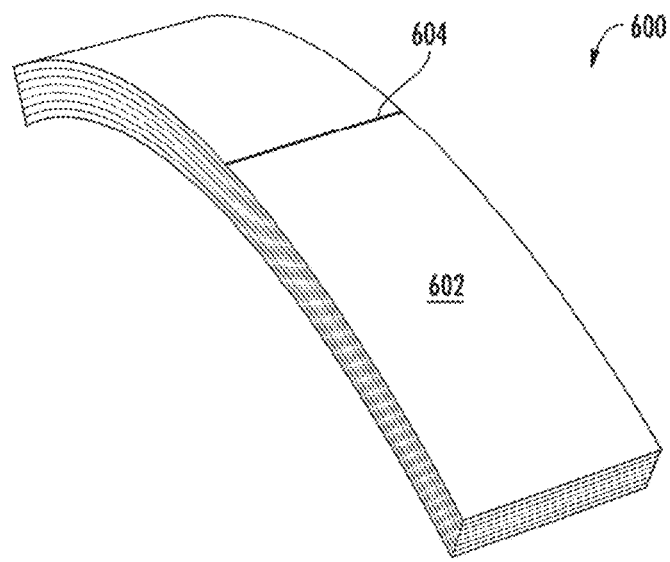
FIGS. 6A and 6B illustrate a peened and non-peened side of a coupon, respectively, in accordance with an example implementation.
Figure 6B:
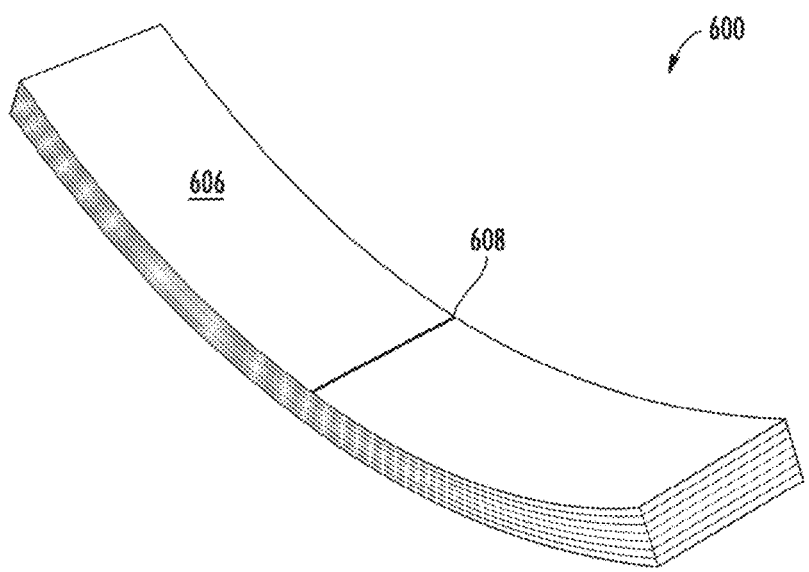

As illustrated in FIG. 5, the measured geometric data 500 may indicate one or more residual stresses at, at least some locations, in the coupon after application of the manufacturing process. In some example implementations, the residual stresses may be measured from a processed surface of the coupon, and an opposite unprocessed surface. For example, FIG. 6A illustrates a coupon 600 having a peened side 602 (or processed side) from which a first strain measurement 604 may be taken. Similarly, FIG. 6B illustrates the coupon 600 having a non-peened side 606 (or unprocessed) from which a second strain measurement 608 may be taken. As further shown in FIGS. 6A and 6B, in some example implementations, the coupons may be rectangular in shape and have a uniform thickness in which, in at least one instance, one of the coupon surfaces may be uniformly processed by a surface process.

It should be noted that while the while the example implementations may be discussed with respect to a rectangular shaped coupon, a surface process as discussed herein may be applied to other geometrical shapes provided that the linear elastic reaction may be described according to the following:

$$\sigma^{lin}(z) = Az + B$$

where the z-direction is along the surface normal.

The computer system 104 may be configured to calculate linear elastic strains in respective opposing sides of the coupon caused by application of the manufacturing process. The linear elastic strains may be calculated based at least in part on the measured geometric data. In some example implementations, calculating the linear elastic strains in the respective opposing sides of the coupon may include estimating the linear elastic strain in a peened side ($\varepsilon_L^1(z)$) and a non-peened side ($\varepsilon_L^2(z)$) of the coupon according to the following:

$$\varepsilon_L^1(z) \cong \frac{1}{2}\left[(\varepsilon_{top}^1 - \varepsilon_{bot}^1)\frac{2}{th}\left(\frac{th}{2} - z\right) + (\varepsilon_{top}^1 + \varepsilon_{bot}^1)\right]$$

$$\varepsilon_L^2(z) \cong \frac{1}{2}\left[(\varepsilon_{top}^2 - \varepsilon_{bot}^2)\frac{2}{th}\left(\frac{th}{2} - z\right) + (\varepsilon_{top}^2 + \varepsilon_{bot}^2)\right]$$

where $\varepsilon_{top}^1$ and $\varepsilon_{bot}^1$ represent microstrains in respectively the peened side and non-peened side along a first direction of the coupon, $\varepsilon_{top}^2$ and $\varepsilon_{bot}^2$ represent microstrains in respectively the peened side and non-peened side along a second direction of the coupon, z represents an inverse surface normal, and th represents the thickness of the coupon. In these implementations, the linear elastic reaction may be calculated according to the following:

$$\sigma^{lin}(z) = \frac{E}{1-v^2}[\varepsilon_L^1(z) + v\varepsilon_L^2(z)],$$

where E represents an elastic modulus, and $v$ represents a Poisson ratio.

Figure 8:
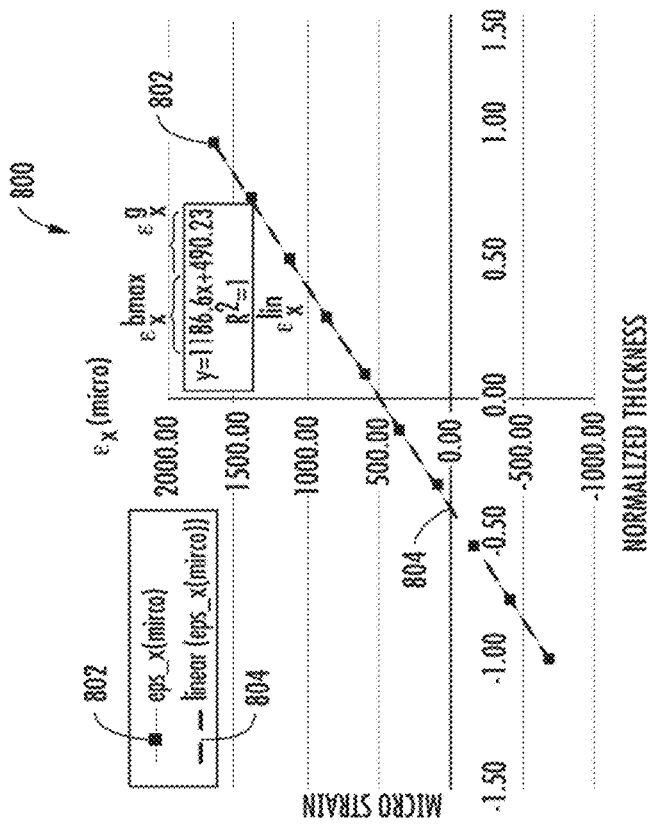
FIG. 8 illustrates a linear elastic strain measurement on an edge of a coupon, in accordance with an example implementation.
Figure 7:
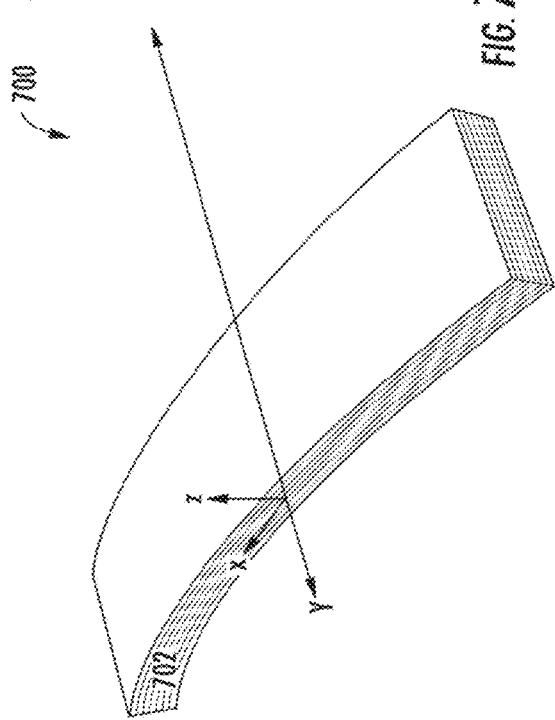
FIG. 7 illustrates an edge of a coupon, in accordance with an example implementation.

Alternatively, in some example implementations, an edge measurement of strains may be used to calculate linear elastic strains in the coupon. For example, as shown in FIGS. 7 and 8, within the coupon 700, a linear elastic strain measured on the inner side of the coupon may be extracted along the edge 702 of the coupon thereby rendering data 800 having a corresponding elastic strain measurement 802. In some implementations, a perfect linear extraction may not be observed, and a linear fit 804 may be applied to the extracted strains to approximate the linear response.

In these implementations, calculating the linear elastic strains may include calculating the linear elastic strain and/or stresses in the edge ($\varepsilon_x^{lin}$) the coupon according to the following:

$$\varepsilon_x^{lin} = -\frac{\sigma_x}{E}$$

where E represents an elastic modulus, and $\sigma_x$ represents the linear elastic reaction.

In particular, the product $-\sigma_x/E$ may be yielded by multiplying the coefficient $$-\frac{1}{E}$$

by the following:

$$\left[\sigma_x - v\overline{\sigma_y}^{\cong 0} - v\overline{\sigma_z}^{\cong 0}\right]$$

In which, $\sigma_y=0$ due to a free surface boundary condition, and $\sigma_z \cong 0$ at the peened and non-peened side (e.g., top and bottom surfaces) according to the free surface boundary condition, and thereby $\sigma_z$ may have little room to develop large magnitudes under an equilibrated condition.

Figure 9:
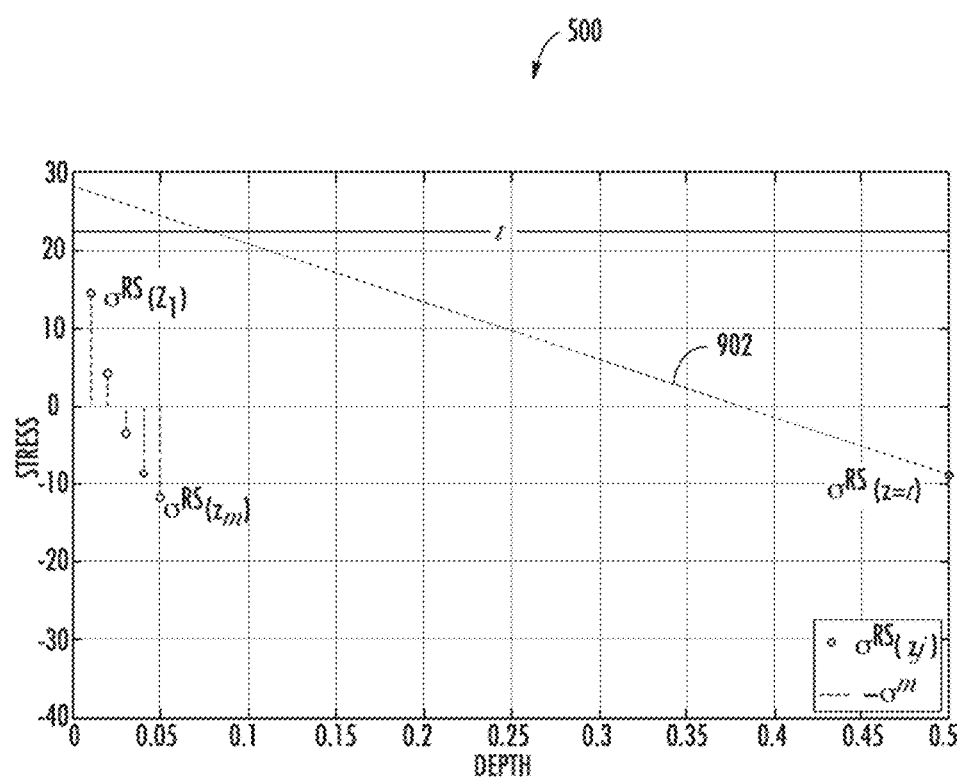
FIG. 9 illustrates a linear response fitting, in accordance with an example implementation.

The computer system 104 may be configured to calculate a linear elastic reaction of the material to the manufacturing process based at least in part on the linear elastic strains. In some implementations, as shown in FIG. 9 for example, a plot 900 may be generated in which the linear elastic reaction 902 of the material may be estimated based at least in part on the measured data (e.g., strain measurements from a scanner), or one or more displacement coefficients and residual stress measurement from a non-peened surface. In particular, FIG. 9 illustrates a linear response fitting (e.g., a slope from displacement fitting) that may be offset from one or more residual stress measurements obtained from a non-peened side of the coupon, $\sigma^{RS}(z=t)$.

In some example implementations, calculating the linear elastic reaction may include calculating the linear elastic reaction ($\sigma^{lin}(z)$) according to the following:

$$\sigma^{lin}(z) = \frac{E}{1-v^2}[\varepsilon_L^1(z) + v\varepsilon_L^2(z)]$$

where z represents an inverse surface normal, E represents an elastic modulus, and $v$ represents a Poisson ratio.

In some example implementations, calculating the linear elastic reaction may include calculating the linear elastic reaction ($\sigma_x^{lin}$) according to the following:

$$\Rightarrow \sigma_x^{lin} = -E\varepsilon_x^{lin} = -E\left[\varepsilon_x^{bmax}\frac{2}{th}\left(\frac{th}{2} - z\right) + \varepsilon_x^g\right]$$

where z represents an inverse surface normal, E represents an elastic modulus, th represents the thickness of the coupon, and $\varepsilon_x^{bmax}$ and $\varepsilon_x^g$ represent respectively a slope and y-intercept of a linear equation by which the linear elastic reaction is defined.

In these example implementations, once the residual stresses are obtained, the linear elastic reactions may be corrected by the linear elastic stresses (e.g., elastic recovery) according to the following:

$$\sigma_x^0 = \sigma_x^{RS} + \sigma_x^{lin} = \sigma_x^{RS} - E\left[\varepsilon_x^{bmax}\frac{2}{th}\left(\frac{th}{2} - z\right) + \varepsilon_x^g\right]$$

In some example implementations, when pre-existing residual stresses ($\sigma_x^{RSM}$) are not negligible (e.g., negligible due to magnitude) an adjustment may incorporate the pre-existing residual stresses according to the following:

$$\sigma_x^0 = \sigma_x^{RS} + \sigma_x^{RSM} + \sigma_x^{lin} = \sigma_x^{RS} + \sigma_x^{RSM} - E\left[\varepsilon_x^{bmax}\frac{2}{th}\left(\frac{th}{2} - z\right) + \varepsilon_x^g\right]$$

In some example implementations, utilizing pre-existing residual stresses in the adjustment may require a substantial match between the linear portion of the residual stress profile after peening and the pre-existing residual stress profile (e.g., the initial stresses may be close to zero after the estimated penetration depth).

In some implementations, the computer system 104 may be configured to calculate the linear elastic reaction by (1) estimating a linear stress component required to restore the geometry of the part to its original configuration prior to the application of the surface process, and (2) an additional residual stress measurement on a surface that has not been processed. For example, in an implementation in which the coupon may be rectangular in shame and have a uniform thickness, a deformed shape of the coupon after application of the surface process (or processes) may be obtained by a scan (e.g., Coordinate Measuring Machine CMM, laser scan, white light diffraction, and the line).

Figure 10C:
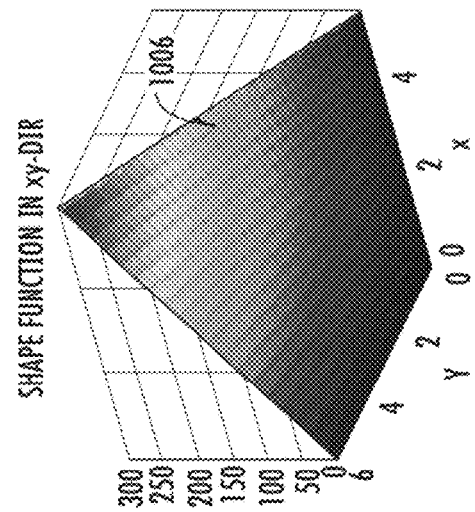
FIGS. 10A-10C illustrate respective shape functions, in accordance with an example implementation.
Figure 10B:
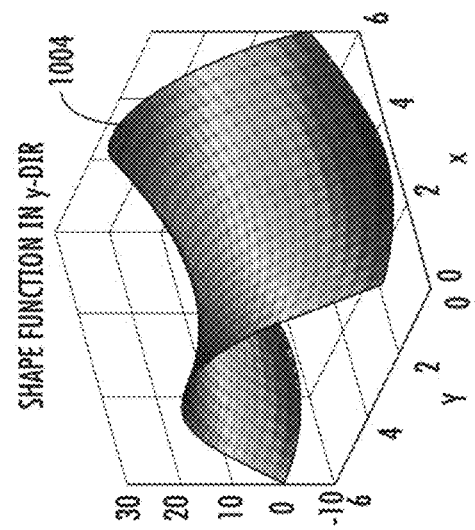
Figure 10A:
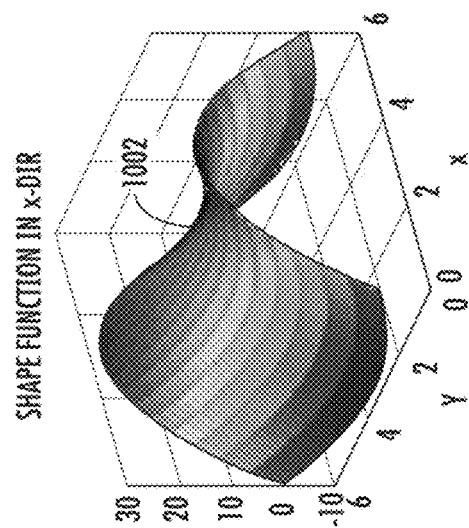

Based at least in part on a fitting, the fitting coefficients ($A_{ij}$) may be calibrated and an estimate of the equilibrium components for the linear elastic reaction ($C_2$ coefficients) may be obtained using various calibration techniques (e.g., least squares fitting). FIGS. 10A, 10B and 10C illustrate respective shape functions 1002, 1004, 1006 that may be obtained from linear stress distributions across the thickness $$\left(e.g., \sigma_{ij} = A_{ij}\left(z - \frac{t}{2}\right)\frac{2}{t}\right),$$

and may be fit (e.g., least squares fit) for each term on the planar stress tensor (i.e., i, j=1, 2).

In these implementations, a linear distribution, the value of the residual stress on a non-peened side opposite to the peened side, respectively, may be calculated according to the following:

$$\sigma^{lin}(z) = A\left(z - \frac{t}{2}\right)\frac{2}{t} + B$$

$$\sigma^{lin}(z = t) = A + B = -\sigma^{RS}(t)$$

And accordingly, the linear distribution may be noted as:

$$\sigma^{lin}(z) = A(z - t)\frac{2}{t} - \sigma^{RS}(t),$$

for each component of the planar stress tensor ($\sigma_x$, $\sigma_y$, and $\tau_{xy}$).

These implementations may be advantageous as the calibration of the linear coefficients may be performed on a large scale, and thereby the results may be more representative of an integral average than results obtained from local measurements. Additionally, an estimate for the $C_2$ coefficient may be computed by integrating the fitted functions.

In some implementations, the computer system 104 may be configured to eliminate the effect of any pre-existing material residual stresses by measuring the coupon before application of the surface process such that:

$$\sigma^{RS}(t) = \sigma^{RST}(t) - \sigma^{RSM}(t)$$

where $\sigma^{RST}(t)$ may be the total residual stress measured after the surface process has been applied, and $\sigma^{RSM}(t)$ may be the residual stress in the material prior to application of the surface process.

Figure 11:
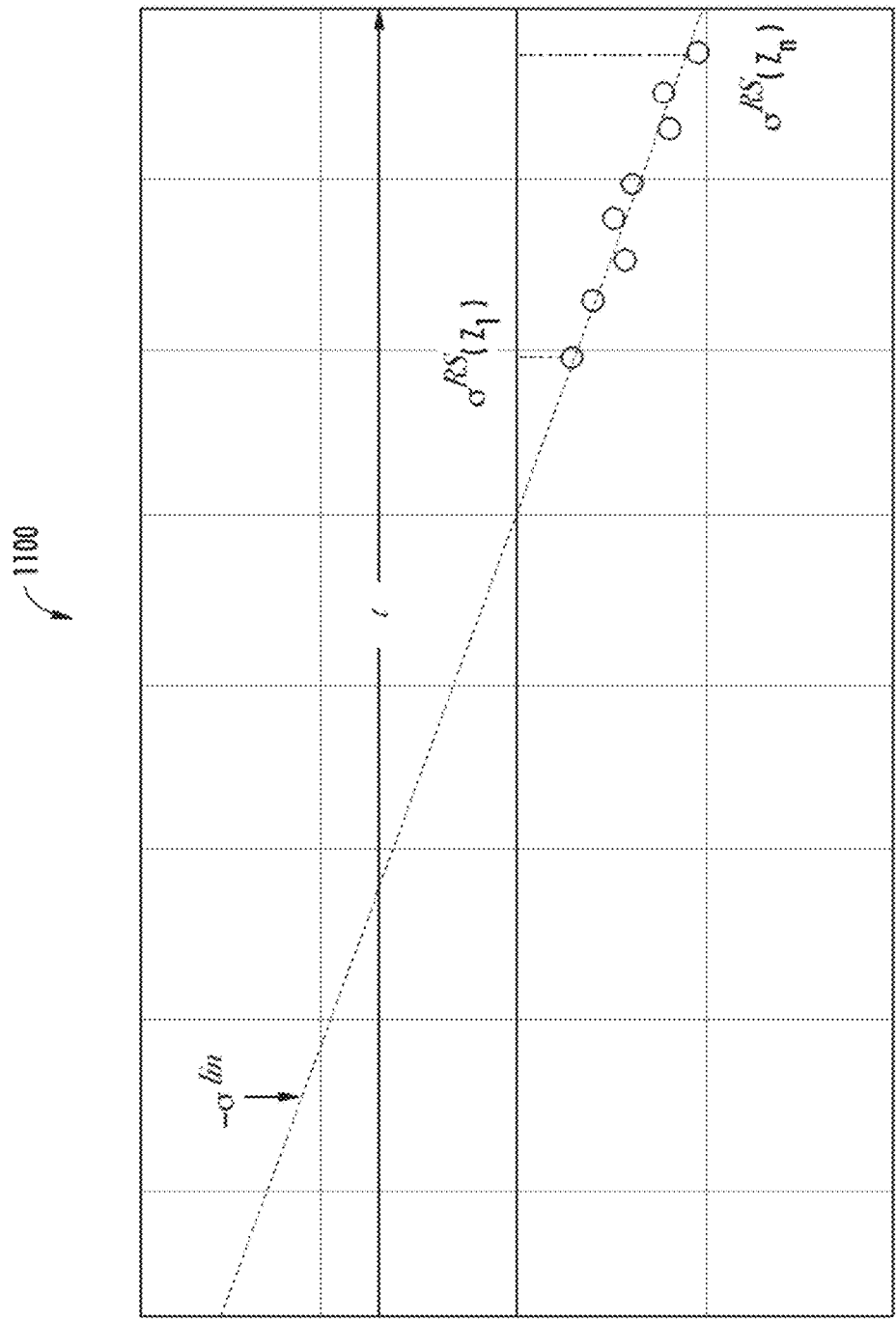
FIG. 11 illustrates residual stress measurements of an un-peened surface, in accordance with an example implementation.

Alternatively, in some implementations, one or more measurements from the un-peened side of the coupon may be utilized, by setting:

$$\sigma^{lin}(z_i) = A\left(z_i - \frac{t}{2}\right)\frac{2}{t} + B = -\sigma^{RS}(z_i), \text{ for } i = 1 \text{ to } n$$

where the sole condition for the points $z_i$ may include being within the linear elastic response range of the material. As illustrated in FIG. 11, in some example implementation in which a linear elastic response is not observed, a fitting may be utilized to determine the coefficient B, as shown by the example of residual stress measurements of plot 1100 for an un-peened surface in which z=0 may be the location for the peened surface.

Figure 12:
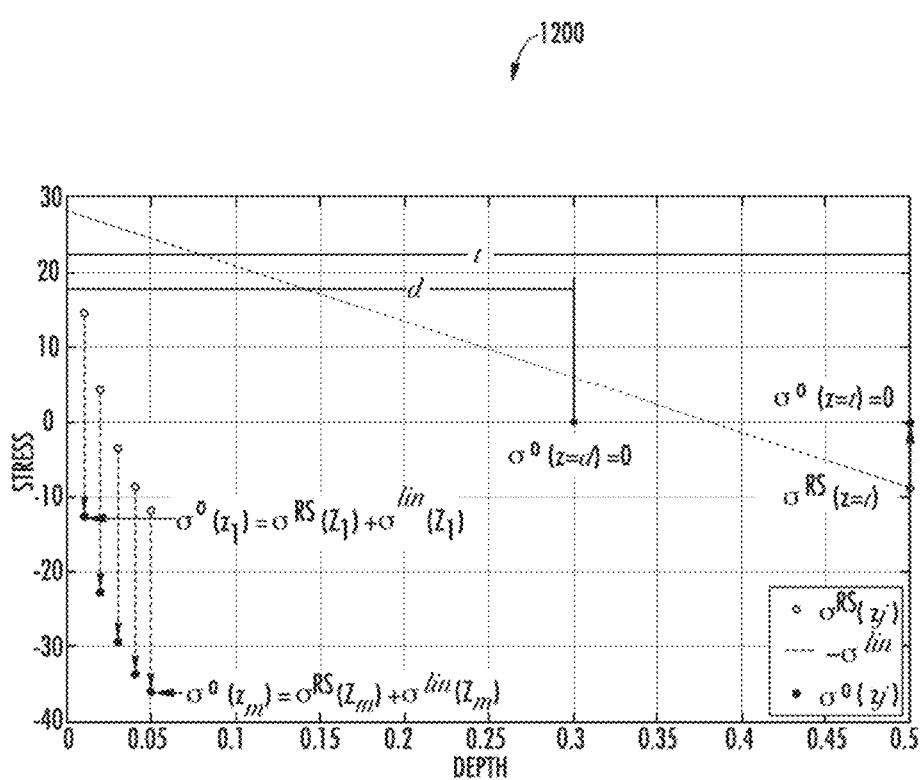
FIG. 12 illustrates a plurality of initial stress computations, in accordance with an example implementation.

In some example implementations, in which the linear elastic reaction of a residual stress measurement may not be clearly distinguished (e.g., an instance in which the depth of the residual stress measurement or the pre-existing residual stresses may be such that a region identifiable as the linear elastic reaction region does not exist), initial stresses may be reconstructed using various implementations. As such, the computer system 104 may be configured to calculate an estimated initial stress in the material as a sum of the residual stress in the coupon and the linear elastic reaction of the material, as illustrated in FIG. 12. In some example implementations, calculating the estimated initial stress may include calculating a plurality of estimated initial stresses.

For example, in some implementations, utilizing an estimated linear elastic reaction, initial stresses may be calculated and/or computer at the locations in which residual stress measurements may be available according to the following:

$$\sigma^0(z_j) = \sigma^{RS}(z_j) + \sigma^{lin}(z_j) \text{ for } j = 1 \text{ to } m$$

where m is the number of measurements, and an approximation of the initial stresses may be noted by the following:

$$\sigma^0 \cong \begin{cases} \sum_{i=1}^{N} A_i\phi_i(z) & \text{for } 0 \le z \le d \\ 0 & \text{for } z > d \end{cases}$$

where d is the penetration of the surface process into the material. In these implementations, it should be noted that, past the penetration depth (d) the material may not be affected by the surface process; therefore, the initial stresses or eigenstrains caused by the surface process may be zero past the penetration depth.

In some example implementations, for each initial stress measurement along the depth the following may be determined:

$$\sigma^0(z_j) \cong \sum_{i=1}^{N} A_i \phi_i(z_j) \text{ for } j = 1 \text{ to } m$$

Figure 13:
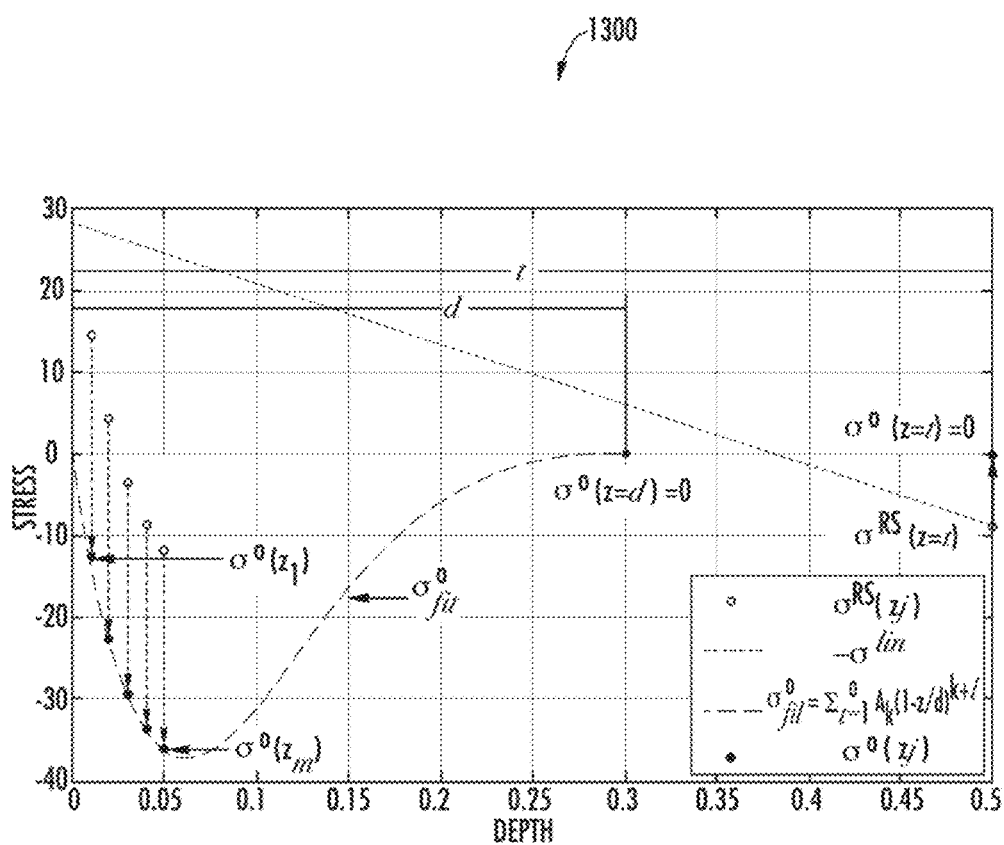
FIG. 13 illustrates a fitting of a plurality of initial stresses, in accordance with an example implementation.

In some example implementations, calculating the plurality of estimated initial stresses may include at least constructing a curve of a plurality of estimated initial stresses based at least in part on fitting the plurality of estimated initial stresses according to an equilibrium condition, as illustrated in the plot 1300 of FIG. 13. In these example implementations, and more particularly in instances in which the penetration d of the surface process may be unknown constructing the curve of the plurality of estimated initial stresses may include calculating the equilibrium condition according to the following:

$$\int_0^t \sigma^0 z \, dz = C_2$$

where t represents a thickness of the material, $\sigma^0$ represents the estimated initial stress, z represents an inverse surface normal, dz represents an initial stress distribution function of the material, and $C_2$ represents a moment resultant. In these implementations, the moment resultant may be more particularly determined according to the following:

$$\int_0^t \sum_{i=1}^{N} A_i \phi_i(z) z \, dz = \sum_{i=1}^{N} A_i \int_0^d \phi_i(z) z \, dz = \sum_{i=1}^{N} A_i C_2^i = C_2$$

Accordingly, the following matrix equation may be solved:

$$\underbrace{\begin{bmatrix} \phi_1(z_1) & \cdots & \phi_N(z_1) \\ \phi_1(z_2) & \cdots & \phi_N(z_2) \\ \vdots & \vdots & \vdots \\ \phi_1(z_m) & \cdots & \phi_N(z_m) \\ C_2^1 & \cdots & C_2^N \end{bmatrix}}_{(m+1) \times N} \underbrace{\begin{Bmatrix} A_1 \\ A_2 \\ \vdots \\ A_N \end{Bmatrix}}_{N \times 1} = \underbrace{\begin{Bmatrix} \sigma^0(z_1) \\ \sigma^0(z_2) \\ \vdots \\ \sigma^0(z_m) \\ C_2 \end{Bmatrix}}_{(m+1) \times 1}$$

in which, in some example implementations, the equation may be solved for the coefficients $A_i$ and penetration depth d using a nonlinear optimization scheme.

In some example implementations, the following shape function may be used for $\phi_i(z)$:

$$\phi_i(z) = \left(1 - \frac{z}{d}\right)^{i+1} \text{ for } i \geq 1$$

which may yield a slope continuous fit to zero at z=d.

In some example implementations, the moment resultant ($C_2$) may be given by:

$$C_2^i = \int_0^d \phi_i(z) z \, dz = \int_0^d \left(1 - \frac{z}{d}\right)^{i+1} z \, dz = \frac{d^2}{i^2 + 5i + 6}$$

in which the following matrix equation may be subsequently solved:

$$\underbrace{\begin{bmatrix} \left(1 - \frac{z_1}{d}\right)^2 & \cdots & \left(1 - \frac{z_1}{d}\right)^{N+1} \\ \left(1 - \frac{z_2}{d}\right)^2 & \cdots & \left(1 - \frac{z_2}{d}\right)^{N+1} \\ \vdots & \vdots & \vdots \\ \left(1 - \frac{z_m}{d}\right)^2 & \cdots & \left(1 - \frac{z_m}{d}\right)^{N+1} \\ \frac{d^2}{12} & \cdots & \frac{d^2}{N^2 + 5N + 6} \end{bmatrix}}_{(m+1) \times N} \underbrace{\begin{Bmatrix} A_1 \\ A_2 \\ \vdots \\ A_N \end{Bmatrix}}_{N \times 1} = \underbrace{\begin{Bmatrix} \sigma^0(z_1) \\ \sigma^0(z_2) \\ \vdots \\ \sigma^0(z_m) \\ C_2 \end{Bmatrix}}_{(m+1) \times 1}$$

In some implementations, in which the linear elastic reaction may be calculated according to the following:

$$\sigma^{lin}(z) = \frac{E}{1 - v^2} [\varepsilon_L^1(z) + v \varepsilon_L^2(z)]$$

the initial stress may be calculated according to the following:

$$\sigma^0 = \sigma^{RS} + \sigma^{lin} = \sigma^{RS} + \frac{E}{1 - v^2} [\varepsilon_L^1(z) + v \varepsilon_L^2(z)]$$

The computer system 104 may be configured to calculate an estimated eigenstrain of the material based at least in part on the estimated initial stress in the material. In some example implementations, calculating the estimated eigenstrain may include calculating the estimated eigenstrain as a product of a stress field of the estimated initial stress and an inverse of a material stiffness matrix of the material. For example, an eigenstrain may be calculated by solving the following:

$$\varepsilon_{ij}^0 = -C_{ijkl}^{-1} \sigma_{ij}^0.$$

In some example implementations, based at least in part on the estimated initial stresses or eigenstrains the computer system 104 may be configured to computer a corresponding distortion and/or residual stress on a complex shape for forming or rectifying problems, for the estimation of the impact of residual stresses on the fatigue life of a component, and/or evaluate a structural integrity of a material or component such as an onset of buckling from surface process.

The computer system 104 may be configured to predict at least one of a deformation, fatigue life, or buckling for a part associated with the material based at least in part on the estimated initial stress in and eigenstrain of the material. In some example implementations, predicting at least one of a deformation, fatigue life or buckling of a part may include generating an output for determining the prediction, and in at least one instance, communicating the output to a secondary system or external application (e.g., Stresscheck, Deform, Abaqus, and the like) for finalizing the prediction.

Figure 14:
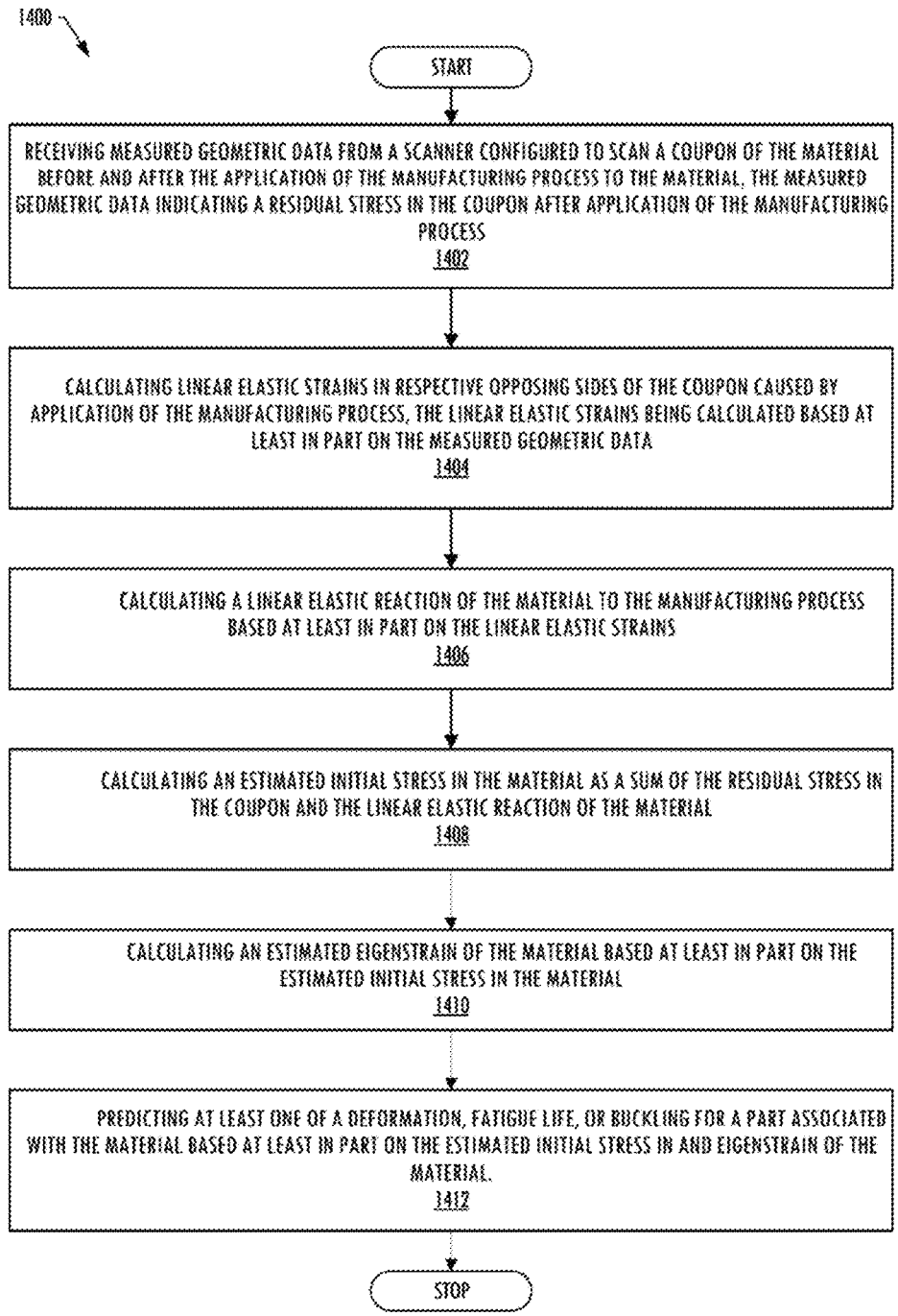
FIG. 14 is a flow diagram illustrating various operations of a method of estimating an initial stress in and an eigenstrain of a material, in accordance with an example implementation.

FIG. 14 illustrates a flowchart including various operations of a method 1400 for estimating an initial stress in and an eigenstrain of a material caused by application of a manufacturing process thereto, in accordance with an example implementation of the present disclosure. As shown at block 1402, the method may include receiving measured geometric data from a scanner configured to scan a coupon of the material before and after the application of the manufacturing process to the material. The measured geometric data may indicate a residual stress in the coupon after application of the manufacturing process. The method may also include calculating linear elastic strains in respective opposing sides of the coupon caused by application of the manufacturing process, as shown at block 1404. The linear elastic strains may be calculated based at least in part on the measured geometric data.

The method may also include calculating a linear elastic reaction of the material to the manufacturing process based at least in part on the linear elastic strains, as shown at block 1406. The method may also include calculating an estimated initial stress in the material as a sum of the residual stress in the coupon and the linear elastic reaction of the material, as shown at block 1408. The method may also include calculating an estimated eigenstrain of the material based at least in part on the estimated initial stress in the material, as shown at block 1410. The method may also include predicting at least one of a deformation, fatigue life, or buckling for a part associated with the material based at least in part on the estimated initial stress in and eigenstrain of the material, as shown at block 1410.

According to example implementations of the present disclosure, the system 100 and its subsystems and/or components including the scanner 102 and/or computer system 104 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 15:
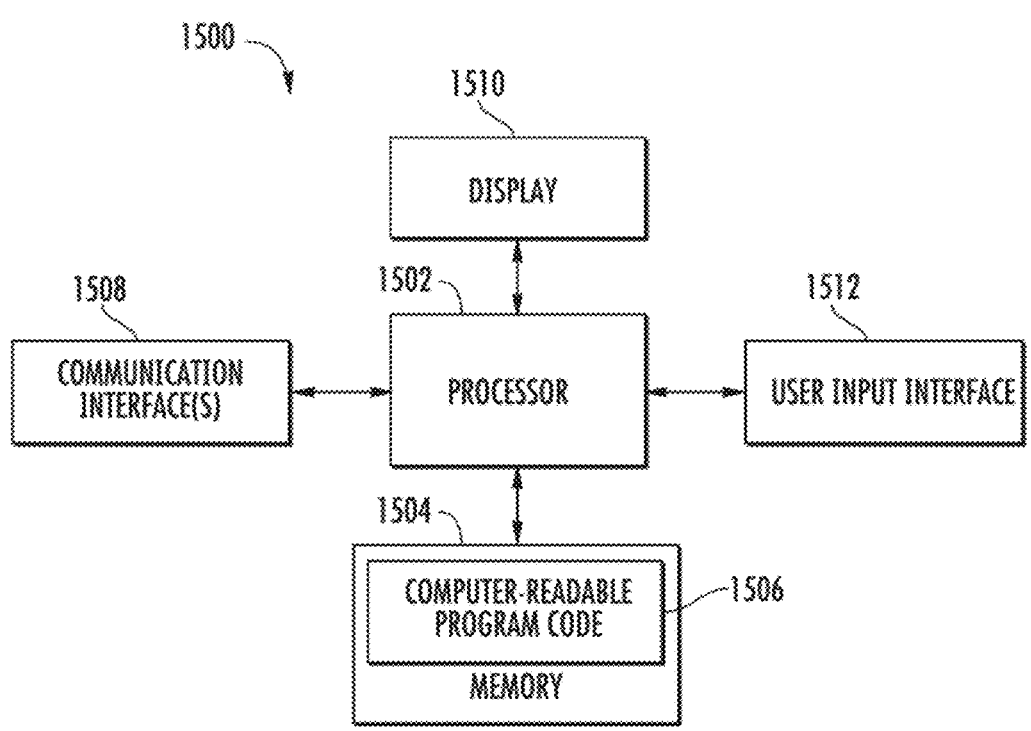
FIG. 15 illustrates an apparatus according to some example implementations.

FIG. 15 illustrates an apparatus 1500 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1502 (e.g., processor unit) connected to a memory 1504 (e.g., storage device).

The processor 1502 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1504 (of the same or another apparatus).

The processor 1502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1504 is generally any piece of computer hardware that is capable of storing information such as, for example, data, computer programs (e.g., computer-readable program code 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 1508 (e.g., communications unit) and/or one or more user interfaces. The communications interface 1508 may be configured to transmit and/or receive information, such as to and/or from other apparatus(es), network(s) or the like. The communications interface 1508 may be configured to transmit and/or receive information by physical (wired) and/or wireless communications links. Examples of suitable communication interfaces 1508 include a network interface controller (NIC), wireless NIC (WNIC) or the like.

The user interfaces may include a display 1510 and/or one or more user input interfaces 1512 (e.g., input/output unit). The display may be configured to present or otherwise display information to a user, suitable examples of which include a liquid crystal display (LCD), light-emitting diode display (LED), plasma display panel (PDP) or the like.

The user input interfaces 1512 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1500 may include a processor 1502 and a computer-readable storage medium or memory 1504 coupled to the processor, where the processor is configured to execute computer-readable program code 1506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus (104, 1500) for estimating an initial stress in and an eigenstrain of a material caused by application of a manufacturing process thereto, the apparatus comprising:
   a processor (1502); and
   a memory (1504) storing executable instructions (1506) that, in response to execution by the processor, cause the apparatus to at least:
   receive measured geometric data from a scanner (102) configured to scan a coupon (600, 700) of the material before and after the application of the manufacturing process to the material, the measured geometric data indicating a residual stress in the coupon after application of the manufacturing process;
   calculate linear elastic strains in respective opposing sides of the coupon caused by application of the manufacturing process, the linear elastic strains being calculated based at least in part on the measured geometric data;
   calculate a linear elastic reaction of the material to the manufacturing process based at least in part on the linear elastic strains;
   calculate an estimated initial stress in the material as a sum of the residual stress in the coupon and the linear elastic reaction of the material;
   calculate an estimated eigenstrain of the material based at least in part on the estimated initial stress in the material; and
   apply the estimated initial stress in and eigenstrain of the material to a part to achieve a predetermined effect to extend fatigue life of the part or reshape the part.

2. The apparatus (104, 1500) of claim 1, wherein the apparatus being caused to calculate the estimated initial stress includes being caused to calculate a plurality of estimated initial stresses, and being caused to calculate the plurality of estimated initial stresses includes being caused to at least construct a curve of the plurality of estimated initial stresses based at least in part on fitting the plurality of estimated initial stresses according to an equilibrium condition, and
   wherein the apparatus being caused to calculate the estimated eigenstrain includes being caused to calculate the estimated eigenstrain as a product of a stress field of the estimated initial stress and an inverse of a material stiffness matrix of the material.

3. The apparatus (104, 1500) of claim 2, wherein the apparatus being caused to at least construct the curve of the plurality of estimated initial stresses includes being caused to calculate the equilibrium condition according to the following:

$$\int_0^t \sigma^0 z \, dz = C_2$$

wherein t represents a thickness of the material, $\sigma^0$ represents the estimated initial stress, z represents an inverse surface normal, dz represents an initial stress distribution function of the material, and $C_2$ represents a moment resultant.

4. The apparatus (104, 1500) of claim 1, wherein the apparatus being caused to calculate the linear elastic strains in the respective opposing sides of the coupon includes being caused to estimate the linear elastic strain in a peened side ($\varepsilon_L^1(z)$) (602) and a non-peened side ($\varepsilon_L^2(z)$) (606) of the coupon (600) according to the following:

$$\varepsilon_L^1(z) \cong \frac{1}{2}\left[(\varepsilon_{top}^1 - \varepsilon_{bot}^1)\frac{2}{th}\left(\frac{th}{2} - z\right) + (\varepsilon_{top}^1 + \varepsilon_{bot}^1)\right]$$

$$\varepsilon_L^2(z) \cong \frac{1}{2}\left[(\varepsilon_{top}^2 - \varepsilon_{bot}^2)\frac{2}{th}\left(\frac{th}{2} - z\right) + (\varepsilon_{top}^2 + \varepsilon_{bot}^2)\right]$$

wherein $\varepsilon_{top}^1$ and $\varepsilon_{bot}^1$ represent microstrains in respectively the peened side and non-peened side along a first direction of the coupon, $\varepsilon_{top}^2$ and $\varepsilon_{bop}^2$ represent microstrains in respectively the peened side and non-peened side along a second direction of the coupon, z represents an inverse surface normal, and th represents the thickness of the coupon.

5. The apparatus (104, 1500) of claim 4, wherein the apparatus being caused to calculate the linear elastic reaction includes being caused to calculate the linear elastic reaction ($\sigma^{lin}(z)$) according to the following:

$$\sigma^{lin}(z) = \frac{E}{1-v^2}[\varepsilon_L^1(z) + v\varepsilon_L^2(z)]$$

wherein z represents an inverse surface normal, E represents an elastic modulus, and v represents a Poisson ratio.

6. The apparatus (104, 1500) of claim 1, wherein the apparatus being caused to calculate the linear elastic strains includes being caused to calculate the linear elastic strain in an edge ($\varepsilon_x^{lin}$) (702) of the coupon (700) according to the following:

$$\varepsilon_x^{lin} = -\frac{\sigma_x}{E}$$

wherein E represents an elastic modulus, and $\sigma_x$ represents the linear elastic reaction.

7. The apparatus (104, 1500) of claim 6, wherein the apparatus being caused to calculate the linear elastic reaction includes being caused to calculate the linear elastic reaction ($\sigma_x^{lin}$) according to the following:

$$\Rightarrow \sigma_x^{lin} = -E\varepsilon_x^{lin} = -E\left[\varepsilon_x^{bmax}\frac{2}{th}\left(\frac{th}{2} - z\right) + \varepsilon_x^g\right]$$

wherein z represents an inverse surface normal, E represents an elastic modulus, th represents the thickness of the coupon, and $\varepsilon_x^{bmax}$ and $\varepsilon_x^g$ represent respectively a slope and y-intercept of a linear equation by which the linear elastic reaction is defined.

8. The apparatus of claim 1, wherein the memory (1504) stores executable instructions (1506) that, in response to execution by the processor (1502), cause the apparatus to further predict at least one of a deformation, fatigue life, or buckling for a part associated with the material based at least in part on the estimated initial stress in and eigenstrain of the material.

9. A method (1400) for estimating an initial stress in and an eigenstrain of a material caused by application of a manufacturing process thereto, the method comprising:

receiving (1402) measured geometric data from a scanner (102) configured to scan a coupon (600, 700) of the material before and after the application of the manufacturing process to the material, the measured geometric data indicating a residual stress in the coupon after application of the manufacturing process;

calculating (1404) linear elastic strains in respective opposing sides of the coupon caused by application of the manufacturing process, the linear elastic strains being calculated based at least in part on the measured geometric data;

calculating (1406) a linear elastic reaction of the material to the manufacturing process based at least in part on the linear elastic strains;

calculating (1408) an estimated initial stress in the material as a sum of the residual stress in the coupon and the linear elastic reaction of the material;

calculating (1410) an estimated eigenstrain of the material based at least in part on the estimated initial stress in the material; and applying the estimated initial stress in and eigenstrain of the material to a part to achieve a predetermined effect to extend fatigue life of the part or reshape the part.

10. The method of claim 9, wherein calculating the estimated initial stress includes calculating a plurality of estimated initial stresses, and calculating the plurality of estimated initial stresses includes at least constructing a curve of the plurality of estimated initial stresses based at least in part on fitting the plurality of estimated initial stresses according to an equilibrium condition, and wherein calculating the estimated eigenstrain includes calculating the estimated eigenstrain as a product of a stress field of the estimated initial stress and an inverse of a material stiffness matrix of the material.

11. The method of claim 10, wherein constructing the curve of the plurality of estimated initial stresses includes calculating the equilibrium condition according to the $$\int_0^t \sigma^0 z\, dz = C_2$$

following:

wherein t represents a thickness of the material, $\sigma^0$ represents the estimated initial stress, z represents an inverse surface normal, dz represents an initial stress distribution function of the material, and $C_2$ represents a moment resultant.

12. The method of claim 9, wherein calculating the linear elastic strains in the respective opposing sides of the coupon includes estimating the linear elastic strain in a peened side ($\varepsilon_L^1(z)$) (602) and a non-peened side ($\varepsilon_L^2(z)$) (606) of the coupon (600) according to the following:

$$\varepsilon_L^1(z) \cong \frac{1}{2}\left[(\varepsilon_{top}^1 - \varepsilon_{bot}^1)\frac{2}{th}\left(\frac{th}{2} - z\right) + (\varepsilon_{top}^1 + \varepsilon_{bot}^1)\right]$$

$$\varepsilon_L^2(z) \cong \frac{1}{2}\left[(\varepsilon_{top}^2 - \varepsilon_{bot}^2)\frac{2}{th}\left(\frac{th}{2} - z\right) + (\varepsilon_{top}^2 + \varepsilon_{bot}^2)\right]$$

wherein $\varepsilon_{top}^1$ and $\varepsilon_{bop}^1$ represent microstrains in respectively the peened side and non-peened side along a first direction of the coupon, $\varepsilon_{top}^2$ and $\varepsilon_{bop}^2$ represent microstrains in respectively the peened side and non-peened side along a second direction of the coupon, z represents an inverse surface normal, and th is the thickness of the coupon.

13. The method of claim 12, wherein calculating the linear elastic reaction includes calculating the linear elastic reaction ($\sigma^{lin}$ (z)) according to the following:

$$\sigma^{lin}(z) = \frac{E}{1-v^2}[\varepsilon_L^1(z) + v\varepsilon_L^2(z)]$$

wherein z represents an inverse surface normal, E represents an elastic modulus, and v represents a Poisson ratio.

14. The method of claim 9, wherein calculating the linear elastic strains includes calculating the linear elastic strain in an edge ($\varepsilon_x^{lin}$) (702) of the coupon (700) according to the following:

$$\varepsilon_x^{lin} = -\frac{\sigma_x}{E}$$

wherein E represents an elastic modulus, and $\sigma_x$ represents the linear elastic reaction.

15. The method of claim 14, wherein calculating the linear elastic reaction includes calculating the linear elastic reaction ($\sigma_x^{lin}$) according to the following:

$$\Rightarrow \sigma_x^{lin} = -E\varepsilon_x^{lin} = -E\left[\varepsilon_x^{bmax}\frac{2}{th}\left(\frac{th}{2}-z\right) + \varepsilon_x^g\right]$$

wherein z represents an inverse surface normal, E represents an elastic modulus, th represents the thickness of the coupon, and $\varepsilon_x^{bmax}$ and $\varepsilon_x^g$ represent respectively a slope and y-intercept of a linear equation by which the linear elastic reaction is defined.

16. The method of claim 9, further comprising predicting (1412) at least one of a deformation, fatigue life, or buckling for a part associated with the material based at least in part on the estimated initial stress in and eigenstrain of the material.

17. A computer-readable storage medium (1504) for estimating an initial stress in and an eigenstrain of a material caused by application of a manufacturing process thereto, the computer-readable storage medium having computer-readable program code (1506) stored therein that, in response to execution by a processor (1502), cause an apparatus (104, 1500) to at least:
receive measured geometric data from a scanner (102) configured to scan a coupon (600, 700) of the material before and after the application of the manufacturing process to the material, the measured geometric data indicating a residual stress in the coupon after application of the manufacturing process;
calculate linear elastic strains in respective opposing sides of the coupon caused by application of the manufacturing process, the linear elastic strains being calculated based at least in part on the measured geometric data;
calculate a linear elastic reaction of the material to the manufacturing process based at least in part on the linear elastic strains;
calculate an estimated initial stress in the material as a sum of the residual stress in the coupon and the linear elastic reaction of the material;
calculate an estimated eigenstrain of the material based at least in part on the estimated initial stress in the material; and
apply the estimated initial stress in and eigenstrain of the material to a part to achieve a predetermined effect to extend fatigue life of the part or reshape the part.

18. The computer-readable storage medium (1504) of claim 17, wherein the apparatus being caused to calculate the estimated initial stress includes being caused to calculate a plurality of estimated initial stresses, and being caused to calculate the plurality of estimated initial stresses includes being caused to at least construct a curve of the plurality of estimated initial stresses based at least in part on fitting the plurality of estimated initial stresses according to an equilibrium condition, and
wherein the apparatus being caused to calculate the estimated eigenstrain includes being caused to calculate the estimated eigenstrain as a product of a stress field of the estimated initial stress and an inverse of a material stiffness matrix of the material.

19. The computer-readable storage medium (1504) of claim 18, wherein the apparatus being caused to at least construct the curve of the plurality of estimated initial stresses includes being caused to calculate the equilibrium condition according to the following:

$$\int_0^t \sigma^0 z\, dz = C_2$$

wherein t represents a thickness of the material, $\sigma^0$ represents the estimated initial stress, z represents an inverse surface normal, dz represents an initial stress distribution function of the material, and $C_2$ represents a moment resultant.

20. The computer-readable storage medium (1504) of claim 17, wherein the apparatus being caused to calculate the linear elastic strains in the respective opposing sides of the coupon includes being caused to estimate the linear elastic strain in a peened side ($\varepsilon_L^1$ (z)) (602) and a non-peened side ($\varepsilon_L^2$(z)) (606) of the coupon (600) according to the following:

$$\varepsilon_L^1(z) \cong \frac{1}{2}\left[(\varepsilon_{top}^1 - \varepsilon_{bot}^1)\frac{2}{th}\left(\frac{th}{2}-z\right) + (\varepsilon_{top}^1 + \varepsilon_{bot}^1)\right]$$

$$\varepsilon_L^2(z) \cong \frac{1}{2}\left[(\varepsilon_{top}^2 - \varepsilon_{bot}^2)\frac{2}{th}\left(\frac{th}{2}-z\right) + (\varepsilon_{top}^2 + \varepsilon_{bot}^2)\right]$$

wherein $\varepsilon_{top}^1$ and $\varepsilon_{bop}^1$ represent microstrains in respectively the peened side and non-peened side along a first direction of the coupon, $\varepsilon_{top}^2$ and $\varepsilon_{bop}^2$ represent microstrains in respectively the peened side and non-peened side along a second direction of the coupon, z represents an inverse surface normal, and th represents the thickness of the coupon.

21. The computer-readable storage medium (1504) of claim 20, wherein the apparatus being caused to calculate the linear elastic reaction includes being caused to calculate the linear elastic reaction ($\sigma^{lin}$ (z)) according to the following:

$$\sigma^{lin}(z) = \frac{E}{1-v^2}[\varepsilon_L^1(z) + v\varepsilon_L^2(z)]$$

wherein z represents an inverse surface normal, E represents an elastic modulus, and ν represents a Poisson ratio.

22. The computer-readable storage medium (1504) of claim 17, wherein the apparatus being caused to calculate the linear elastic strains includes being caused to calculate the linear elastic strain in an edge ($\varepsilon_x^{lin}$) (702) of the coupon (700) according to the following:

$$\varepsilon_x^{lin} = -\frac{\sigma_x}{E}$$

wherein E represents an elastic modulus, and $\sigma_x$ represents the linear elastic reaction.

23. The computer-readable storage medium (1504) of claim 22, wherein the apparatus being caused to calculate the linear elastic reaction includes being caused to calculate the linear elastic reaction ($\sigma_x^{lin}$) according to the following:

$$\Rightarrow \sigma_x^{lin} = -E\varepsilon_x^{lin} = -E\left[\varepsilon_x^{bmax}\frac{2}{th}\left(\frac{th}{2}-z\right)+\varepsilon_x^g\right]$$

wherein z represents an inverse surface normal, E represents an elastic modulus, th represents the thickness of the coupon, and $\varepsilon_x^{bmax}$ and $\varepsilon_x^g$ represent respectively a slope and y-intercept of a linear equation by which the linear elastic reaction is defined.

24. The computer-readable storage medium of claim 17, wherein the computer-readable storage medium has computer-readable program code (1506) stored therein that, in response to execution by the processor (1502), cause the apparatus to further predict at least one of a deformation, fatigue life, or buckling for a part associated with the material based at least in part on the estimated initial stress in and eigenstrain of the material.

* * * * *